(12) United States Patent
Kim et al.

(10) Patent No.: US 10,394,355 B2
(45) Date of Patent: Aug. 27, 2019

(54) DISPLAY DEVICE WITH BUILT-IN TOUCH SCREEN AND METHOD OF FABRICATING THE SAME

(71) Applicant: LG Display Co., Ltd., Seoul (KR)

(72) Inventors: Hyunho Kim, Daegu (KR); SunJa Park, Gyeongsangbuk-do (KR); Dongmin Seo, Gyeongsangbuk-do (KR); JeongHo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 27 days.

(21) Appl. No.: 15/382,374

(22) Filed: Dec. 16, 2016

(65) Prior Publication Data

US 2017/0192571 A1    Jul. 6, 2017

(30) Foreign Application Priority Data

Dec. 31, 2015  (KR) .................. 10-2015-0191839

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC ...... G06F 3/044; G06F 3/0412; G06F 3/0416; G06F 2203/04103; G06F 2203/04111; G06F 3/047; G06F 2203/04112; G06F 3/0418; G06F 2203/04107; G06F 3/041; G06F 1/1637; G06F 1/1643; G06F 2203/04106; G06F 2203/04104; G02F 1/133345; G02F 1/136286; G02F 2001/134318
USPC .................................. 345/173–175
See application file for complete search history.

(56) References Cited

U.S. PATENT DOCUMENTS 8,933,460 B2    1/2015  Kim et al.
8,933,898 B2 *  1/2015  Lee ...................... G06F 3/0412
                                                   345/173

(Continued)

FOREIGN PATENT DOCUMENTS

CN       101071217 A    11/2007
CN       102110424 A     6/2011
(Continued)

*Primary Examiner* — Duc Q Dinh
(74) *Attorney, Agent, or Firm* — Fenwick & West LLP

(57) ABSTRACT

Disclosed is a display device with a built-in touch screen. The display device includes a gate electrode and a pixel electrode on a substrate, an activation layer and a sensing contact portion, a source electrode and a drain electrode, and a gate insulation layer provided between the gate electrode and the activation layer and between the pixel electrode and the sensing contact portion. Thereby, it is possible to reduce the number of data lines arranged in the display panel. Also disclosed is a method of fabricating a display device with a built-in touch screen. The method includes forming a first gate electrode and a pixel electrode according to a first mask process, and forming an activation layer, a source electrode, a drain electrode, and a touch sensing line according to a second mask process. Thereby, it is possible to reduce the number of mask processes.

22 Claims, 17 Drawing Sheets

(51) Int. Cl.
   *G02F 1/1343* (2006.01)
   *G02F 1/1362* (2006.01)
   *G02F 1/1368* (2006.01)
   *G06F 3/044* (2006.01)

(52) U.S. Cl.
   CPC .... *G02F 1/13439* (2013.01); *G02F 1/133345* (2013.01); *G02F 1/134309* (2013.01); *G02F 1/136227* (2013.01); *G02F 1/136286* (2013.01); *G06F 3/044* (2013.01); *G02F 2001/134345* (2013.01); *G02F 2001/136295* (2013.01); *G02F 2201/121* (2013.01); *G02F 2201/123* (2013.01); *G02F 2201/50* (2013.01); *G06F 2203/04103* (2013.01); *G06F 2203/04111* (2013.01)

(56) References Cited

U.S. PATENT DOCUMENTS

| | | | |
|---|---|---|---|
| 9,274,630 B2 * | 3/2016 | Xu | G06F 3/0412 |
| 2012/0069257 A1 * | 3/2012 | Oh | G02F 1/13338 |
| | | | 349/42 |
| 2012/0105337 A1 * | 5/2012 | Jun | G06F 3/0412 |
| | | | 345/173 |
| 2012/0120362 A1 * | 5/2012 | Choi | H01L 27/1225 |
| | | | 349/140 |
| 2014/0125626 A1 * | 5/2014 | Yang | G02F 1/134336 |
| | | | 345/174 |
| 2016/0246398 A1 * | 8/2016 | Huang | G06F 3/044 |

FOREIGN PATENT DOCUMENTS

| | | |
|---|---|---|
| CN | 102466907 A | 5/2012 |
| CN | 104460080 A | 3/2015 |

\* cited by examiner

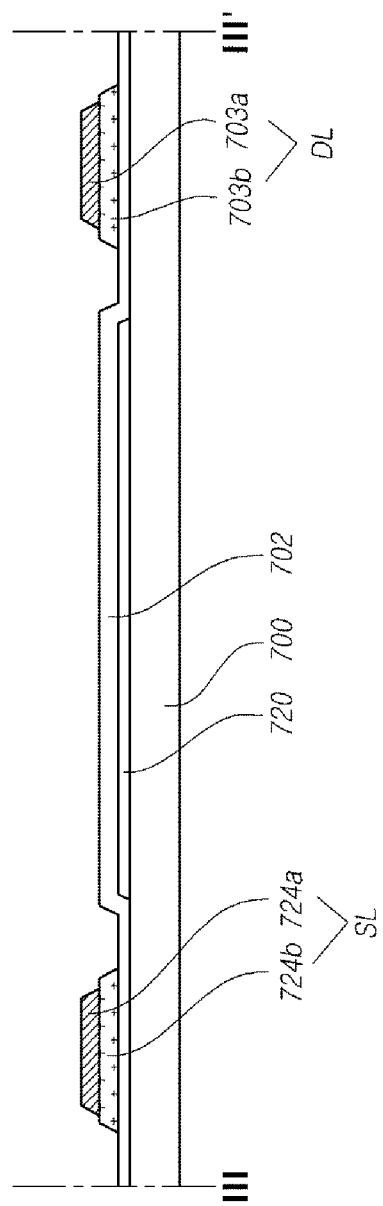

DISPLAY DEVICE WITH BUILT-IN TOUCH SCREEN AND METHOD OF FABRICATING THE SAME

CROSS REFERENCE TO RELATED APPLICATION

This application claims priority from Republic of Korea Patent Application No. 10-2015-0191839, filed on Dec. 31, 2015, which is hereby incorporated by reference for all purposes as if fully set forth herein.

BACKGROUND

1. Related Field

The present disclosure relates to a display device with a built-in type touch screen and a method of fabricating the display device.

2. Description of the Prior Art

As the information-oriented society has been developed, various types of requests for a display device for displaying an image have increased, and various display devices, such as Liquid Crystal Display (LCD), Plasma Display Panel (PDP), and Organic Light Emitting Display (OLED) devices, have been utilized.

Such display devices have moved away from typical input systems using a button, a keyboard, or a mouse, and has provided a touch-based input system that enables a user to easily input information or a command intuitively and conveniently.

In order to provide such a touch-based input method, it is necessary to determine the existence or non-existence of a user's touch, and to correctly detect a touch coordinate.

For this purpose, touch sensing has been conventionally provided by employing one selected from various types of touch systems, such as a resistance film type touch system, a capacitance type touch system, an electromagnetic induction type touch system, an infrared type touch system, and an ultrasonic type touch system.

In addition, in applying a touch screen to a display device, developments have been made to build a touch sensor in the display device. Particularly, an in-cell type display device has been developed in which a common electrode formed in a lower substrate is utilized as a touch electrode.

However, the in-cell type display device has a disadvantage in that because it is necessary to form a separate touch sensing line connected to the touch electrode, a detailed additional process is needed which causes the fabrication costs and time to increase.

SUMMARY

An object of the present disclosure is to provide a display device with a built-in type touch screen in which thin film transistors (TFTs) are arranged in a zigzag form in the subpixels on the left and right sides of a data line such that the number of data lines arranged in a display panel is reduced.

In addition, another object of the present disclosure is to provide a method of fabricating a display device with a built-in type touch screen in which a pixel electrode is formed simultaneously when forming a gate electrode, and a touch sensing line is formed simultaneously when forming a data line such that the number of mask processes is reduced.

In order to solve the problems of the above-described problems of the related art, there is provided a display device with a built-in touch screen. The display device includes a gate electrode and a pixel electrode on a substrate, an activation layer and a sensing contact portion on the substrate, a source electrode and a drain electrode on the activation layer, and a gate insulation layer provided between the gate electrode and the activation layer and between the pixel electrode and the sensing contact portion. The gate electrode includes a first gate pattern and a second gate pattern, and the pixel electrode is made of the same material as the second gate pattern. Thereby, it is possible to reduce the number of data lines arranged in the display panel.

In addition, there is provided a method of fabricating a display device with a built-in touch screen. The method includes, forming a gate electrode and a pixel electrode on a substrate according to a first mask process, forming an activation layer, a source electrode, and a drain electrode, and a touch sensing line on the substrate on which the gate electrode and the pixel electrode are formed, according to a second mask process, forming a protective layer on the substrate on which the touch sensing line is formed, and forming a first contact hole that exposes a portion of the pixel electrode and a second contact hole that exposes a portion of the touch sensing line according to a third mask process, and forming a common electrode that overlaps with the pixel electrode on the substrate in which the first and second contact holes are formed, according to fourth mask process. Thereby, it is possible to reduce the number of mask processes.

Embodiments also relate to a display device. The display device includes a gate line extending along a first direction on a substrate, a data line extending along a second direction directly on an insulation layer on the substrate, and a subpixel at an intersection of the gate line and the data line. The subpixel includes a pixel electrode, and a transistor including a gate electrode on the substrate, a part of the insulation layer on the gate electrode, a semiconductor layer on the part of the gate insulation layer, a drain electrode on the semiconductor layer, and a source electrode on the semiconductor layer. The drain electrode is electrically connected to the pixel electrode, and the source electrode is electrically connected to the data line. The display device also includes a common electrode overlapping with the pixel electrode, and a touch sensing line directly on the insulation layer. The touch sensing line is electrically connected to the common electrode.

Embodiments also relate to a method of fabricating a display device. A gate line is formed on a substrate. The gate line extends in a first direction. A gate electrode and a pixel electrode are formed on the substrate, and a gate insulation layer is formed over the gate line, the gate electrode, and the pixel electrode. A semiconductor layer is formed on the gate insulation layer, and the semiconductor layer overlaps with a part of the gate electrode. At least a part of the data line and at least a part of the touch sensing line are formed on the gate insulation layer according to a first mask process. A source electrode and a drain electrode are formed on the semiconductor layer. The drain electrode is electrically connected to the pixel electrode and the source electrode is electrically connected to the data line. A common electrode is formed and overlaps with the pixel electrode. The common electrode is electrically connected to the touch sensing line. The gate electrode, the gate insulation layer, the semiconductor layer, the source electrode, and the drain electrode form a transistor, and the transistor and the pixel electrode form a subpixel.

According to a display device with a built-in type touch screen (hereinafter, referred to as a "touch screen built-in type display device") of the present disclosure, it is possible to reduce the number of data lines arranged in a display panel by arranging TFTs in a zigzag form in the subpixels on the left and right sides of each data line.

In addition, according to a method of fabricating a touch screen built-in type display device of the present disclosure, it is possible to reduce the number of mask processes by forming a pixel electrode simultaneously when forming a gate electrode, and forming a touch sensing line simultaneously when forming a data line.

BRIEF DESCRIPTION OF THE DRAWINGS

The above and other objects, features, and advantages of the present invention will be more apparent from the following detailed description taken in conjunction with the accompanying drawings.

FIGS. 10A, 10B, 11A, 11B, 12A, 12B, 13A, and 13B are views illustrating fabrication processes of a touch-screen built-in type display device according to an embodiment of the present disclosure.

DETAILED DESCRIPTION OF THE EXEMPLARY EMBODIMENTS

Figure 1:
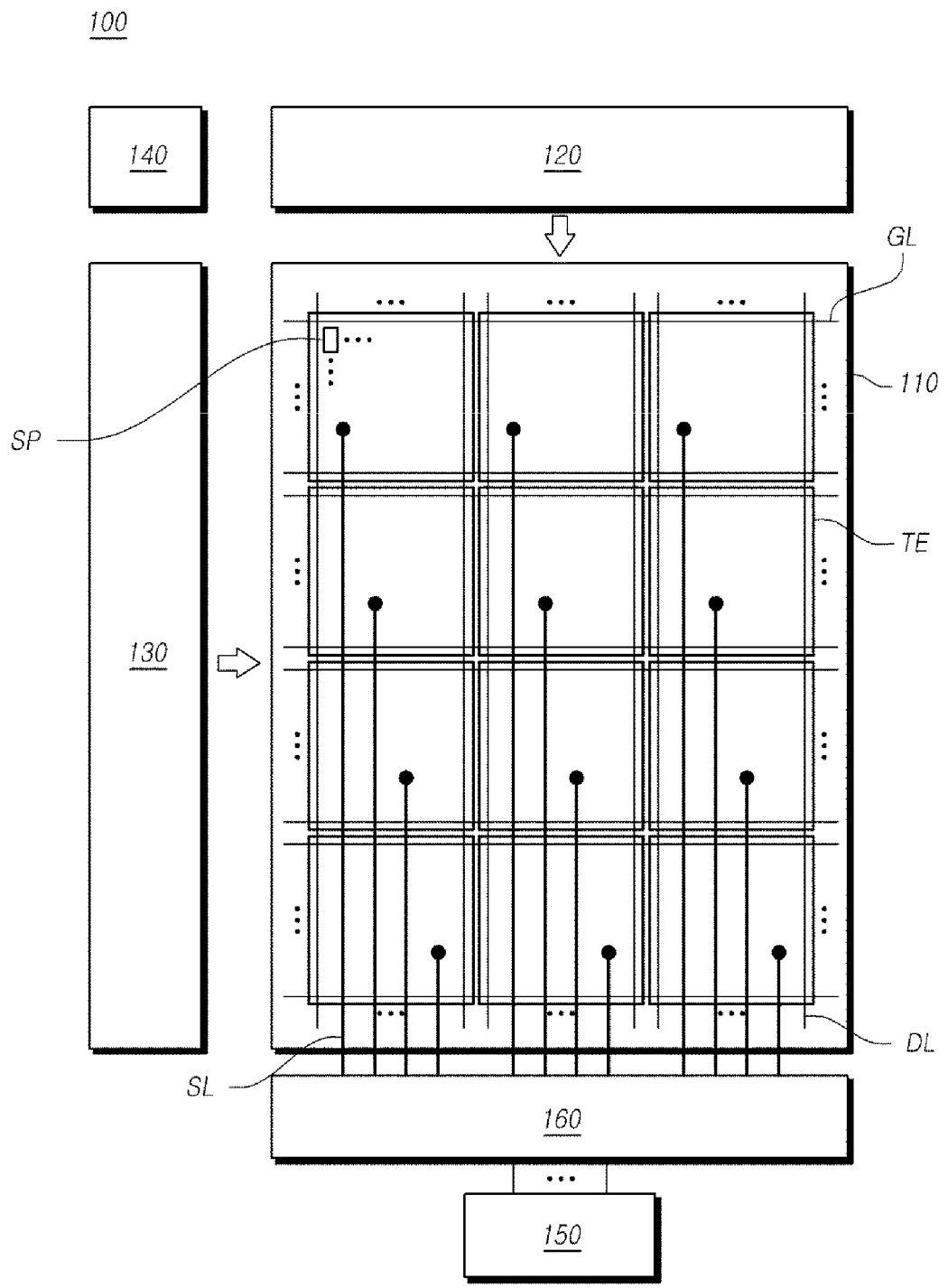
FIG. 1 is a block diagram of a touch-screen built-in type display device according to an embodiment of the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims.

The shapes, sizes, ratios, angles, numbers, and the like shown in the drawings for explaining embodiments of the present disclosure are illustrative, and therefore the present disclosure is not limited to the shown matters. Throughout the specification, the same or like reference numerals designate the same or like elements. Further, in the description of the present disclosure, when it is determined that the detailed description of the related well-known technologies unnecessarily make the subject matter of the present disclosure unclear, the detailed description will be omitted.

When the expression "include", "have", "comprise", or the like as mentioned herein is used, any other part may be added unless the expression "only" is used. When an element is expressed in the singular, the element covers the plural form unless a special mention is explicitly made of the element.

In interpreting terms for constituent elements, the terms are interpreted as including an error range even if there is no apparent description.

When a positional relationship of two parts is described using, for example, "on - - - ," "above - - - ," "below - - - ," "beside - - - ," or the like, another part may be positioned between the two parts unless a term such as, "just" or "directly," is used.

When a time relationship is described using, for example, "after - - - ," "next to - - - ," "before - - - ," or the like in order to describe a temporal before-after relationship, it may also include a discontinuous case unless a tem such as, "just" or "directly," is used.

While "first," "second," or the like is used in order to describe various constituent elements, the constituent elements are not limited by such terms. Such terms are merely used in order to differentiate one constituent element from another constituent element. Accordingly, when a constituent element is referred to as a first constituent element hereinafter, it may be a second constituent element within the technical idea of the present disclosure.

Respective features of various embodiments of the present disclosure may be selectively or entirely coupled to or combined with each other, and may be variously interlocked and driven in a technical sense. Respective embodiments may be executed independently from each other, or may be executed together with an associated relation.

Hereinafter, embodiments of the present disclosure will be described in detail with reference to illustrative drawings. In the drawings, the sizes, the thickness, size, or the like of a device may be exaggeratedly expressed for the convenience of illustration. Over the whole of the specification, similar reference numerals denote similar constituent elements.

FIG. 1 is a block diagram of a touch screen built-in type display device 100 according to an embodiment of the present disclosure.

Referring to FIG. 1, the touch screen built-in type display device 100 according to the present disclosure is a display device capable of providing an image indicating function (display function) and a touch sensing function.

The touch screen built-in type display device 100 according to the present disclosure may be, for example, a middle and large size device having a touch sensing function for a touch input (e.g., a TV or a monitor) or a mobile device (e.g., a smart phone or a tablet).

Referring to FIG. 1, the touch screen built-in type display device 100 according to the present disclosure includes a display panel 110, a data driver 120, a gate driver 130, a controller 140, and so on in order to provide the display function.

The display panel 110 may include a plurality of data lines DL arranged in a first direction (e.g., column direction) and a plurality of gate lines GL arranged in a second direction (e.g., row direction).

The data driver 120 drives the plurality of data lines DL. Herein, the data driver 120 may also be referred to as a "source driver."

The gate driver 130 drives the plurality of gate lines GL. Herein, the gate driver 130 may also be referred to as a "scan driver."

The controller 140 controls the data driver 120 and the gate driver 130, and for this purpose, supplies various control signals to the data driver 120 and the gate driver 130.

The controller 140 starts scanning according to a timing implemented in each frame, converts input image data input from the outside to be suitable for a data signal form used in the data driver 120, thereby outputting converted image data, and controls data driving at a proper time to suit the scanning.

The controller 140 may be a timing controller that is used in a typical display technique, or a control device that includes the timing controller to additionally perform other control functions.

The gate driver 130 sequentially supplies an ON voltage or OFF voltage scan signal to the plurality of gate lines GL according to the control of the controller 140.

When a specific gate line is turned on by the gate driver 130, the data driver 120 converts image data received from the controller 140 into a data voltage in an analog form and sends the data voltage to the plurality of data lines DL.

In FIG. 1, the data driver 120 is only positioned at one side (e.g., upper side or lower side) of the display panel 110, but the data driver 120 may be positioned at each of the opposite sides (e.g., upper side and lower side) according to a driving method, a panel design method, or the like.

In FIG. 1, the gate driver 130 is only positioned at one side (e.g., left side or right side) of the display panel 110, but gate drives may be positioned at the both sides (e.g., left side and right side) according to a driving method, a panel design method, or the like.

The above-mentioned controller 140 receives, from the outside (e.g., a host system), various timing signals including a vertical synchronous signal Vsync, a horizontal synchronous signal Hsync, an input Data Enable (DE) signal, and a clock signal CLK together with input image data.

The touch screen built-in type display device 100 according to the present disclosure may be any of various types of devices, such as an LCD device, an OLED device, and a PDP device. For example, the touch screen built-in type display device 100 may be an In-Plane Switching (IPS) type LCD device that employs a method of expressing images by arranging liquid crystal molecules horizontally and rotating the liquid crystal molecules in place, and has advantages in terms of a high resolution, a low power, a wide viewing angle, and so on. More specifically, the touch screen built-in type display device 100 may be an Advanced High Performance-IPS (AH-IPS) type LCD device.

Each subpixel SP arranged in the display panel 110 may include a circuit element, such as a transistor.

Meanwhile, the touch screen built-in type display device 100 according to the present disclosure may include a touch system for providing a touch sensing function.

Referring to FIG. 1, the touch system may include a plurality of touch electrodes TE that function as touch sensors, a touch circuit 150 that drives the plurality of touch electrodes TE for sensing a touch, and so on.

The touch circuit 150 may sequentially drive the plurality of touch electrodes TE by sequentially supplying a touch driving signal to the plurality of touch electrodes TE.

Thereafter, the touch circuit 150 receives a touch sensing signal from a touch electrode TE to which the touch driving signal is applied.

The touch circuit 150 may determine the existence or non-existence of a touch and may calculate a touch coordinate on the basis of a touch sensing signal received from each of the plurality of touch electrodes TE.

Here, the touch driving signal may have a waveform of a pulse modulation signal having, for example, two or more voltage levels.

The touch sensing signal received from the plurality of touch electrodes TE may be changed depending on the existence or non-existence of touch occurrences by a pointer, such as a finger or a pen, around a corresponding touch electrode TE.

The touch circuit 150 may identify a change in capacitance (or a change in voltage or a change in charge) or the like in a touch electrode TE on the basis of a touch sensing signal so as to determine the existence or non-existence of a touch and a touch coordinate.

Referring to FIG. 1, a touch sensing line SL is connected to each of the plurality of touch electrodes TE in order to supply a touch driving signal to each of the plurality of touch electrodes TE.

In addition, the touch system may further include a switch circuit 160 that sequentially connects the touch sensing lines SL, which are respectively connected to the plurality of touch electrodes TE, to the touch circuit 150 in order to sequentially supply the touch driving signal to each of the plurality of touch electrodes TE.

The switch circuit 160 may include at least one multiplexer.

Meanwhile, referring to FIG. 1, each of the plurality of touch electrodes TE may take a form of a block.

In addition, each touch electrode TE may have a size that is the same as, or corresponds to, one subpixel SP region.

Unlike this, each touch electrode TE may have a size that is larger than that of the subpixel SP region, as illustrated in FIG. 1.

That is, each touch electrode TE region may have a size that corresponds to two or more subpixel SP regions.

Meanwhile, referring to FIG. 1, the plurality of touch electrodes TE may be arranged by being built in the display panel 110.

In this sense, it can be said that the display panel 110 accommodates a touch screen or a touch screen panel therein. That is, the display panel 110 may be an in-cell type or on-cell type touch screen built-in type display panel.

Meanwhile, the touch screen built-in type display device 100 according to the present disclosure may operate in a display mode in order to provide a display function or in a touch mode in order to provide a touch sensing function.

In connection with this, the plurality of touch electrodes TE operate as touch sensors in a touch mode section, but may be used as display mode electrodes in a display mode section.

For example, in the display mode section, the plurality of touch electrodes TE may operate as common electrodes to which a common voltage Vcom is applied, as an example of display mode electrodes.

Here, the common voltage Vcom corresponds to a common voltage that is applied to a common electrode.

Figure 2:
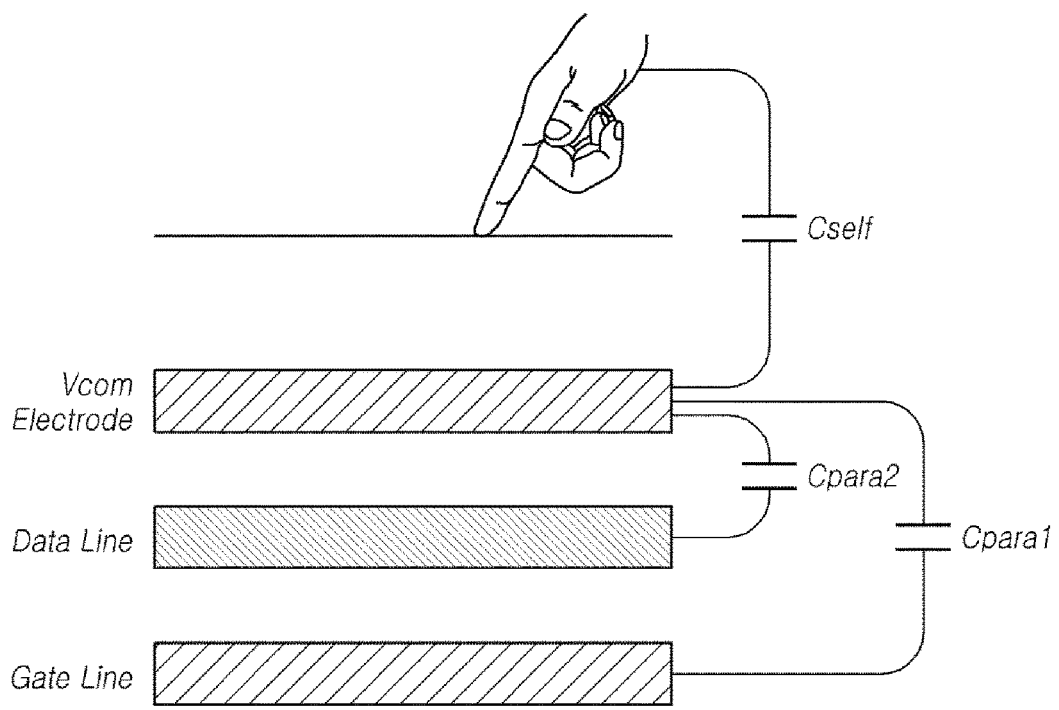
FIG. 2 is a view illustrating capacitance components (Cself, Cpara1, and Cpara2) generated during a touch mode in a touch-screen built-in type display device according to an embodiment of the present disclosure.

FIG. 2 is a view illustrating capacitance components (Cself, Cpara1, and Cpara2) generated during a touch mode in a touch-screen built-in type display device 100 according to an embodiment of the present disclosure.

Referring to FIG. 2, the plurality of touch electrodes TE, which function as touch electrodes in the touch mode and function as common electrodes Vcom Electrode that form liquid crystal capacitors in the display mode, form a self-capacitance Cself with a pointer, such as a finger or a pen, in order to detect the existence or non-existence of a touch in the touch mode.

Meanwhile, the plurality of touch electrodes TE, which function also as common electrodes, may also form parasitic capacitances Cpara1 and Cpara2 with a gate line and a data line, but the parasitic capacitances are very small compared to the self-capacitance to be negligible.

Hereinafter, a method of applying a common voltage and a touch driving signal to a plurality of touch electrodes TE11 to TE14, TE21 to TE24, and TE31 to TE34 that function as all of a display panel 110, common electrodes, and touch electrodes, which are included in a touch screen built-in type display device 100, a method of applying a data voltage and a touch driving signal (or a signal corresponding thereto) to a data line DL, and a method of applying a data voltage and a touch driving signal (or a signal corresponding thereto) to a gate line GL will be described in more detail.

Figure 3:
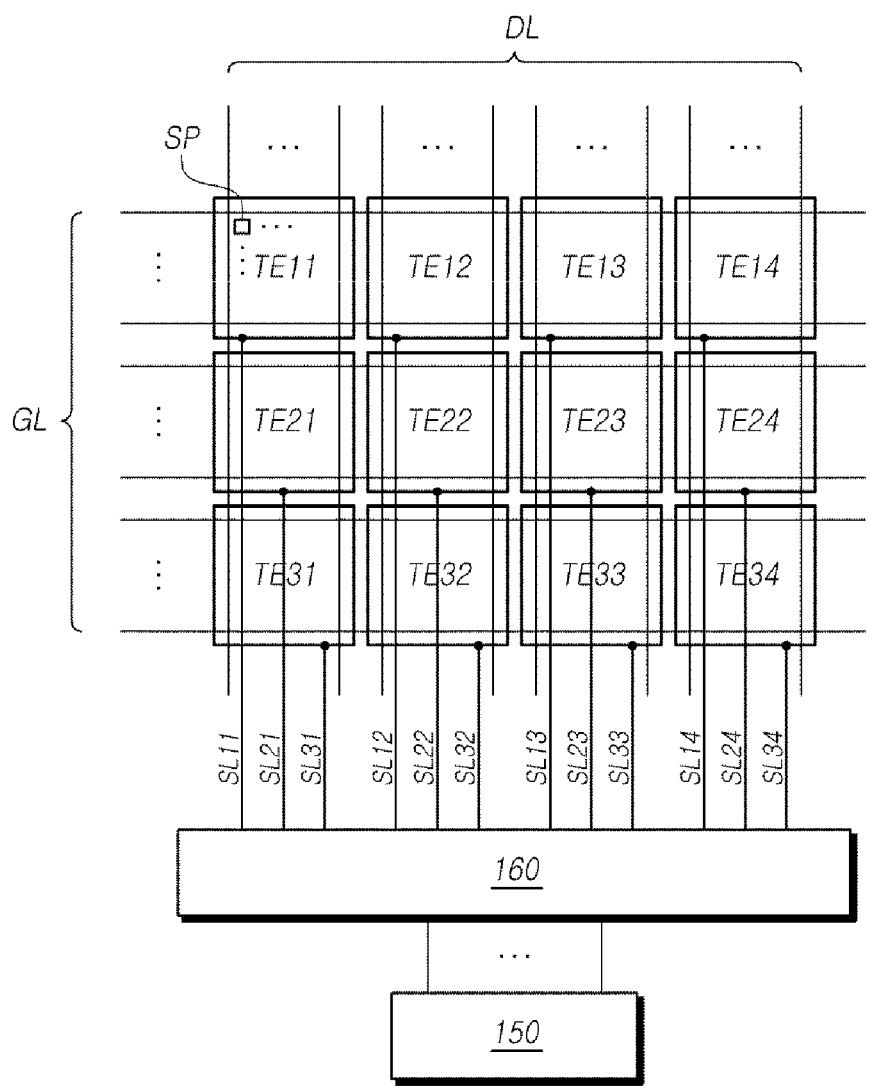
FIG. 3 is a plan view of a display panel included in a touch-screen built-in type display device according to an embodiment of the present disclosure.

FIG. 3 is a plan view of a display panel included in a touch-screen built-in type display device according to an embodiment of the present disclosure.

Referring to FIG. 3, as described above, the display panel 110 is formed with a plurality of data lines DL, a plurality of gate lines GL, and a plurality of touch electrodes TE11 to TE14, TE21 to TE24, and TE31 to TE34.

In addition, as described above, the display panel 110 may operate in a display mode or in a touch mode.

In connection with this, the plurality of data lines DL and the plurality of gate lines GL formed in the display panel 110 are provided in order to enable the display panel 110 to function as a panel that displays an image.

In addition, the plurality of touch electrodes TE11 to TE14, TE21 to TE24, and TE31 to TE34 formed in the display panel 110 are provided in order to enable the display panel 110 to function both as a display panel and a touch screen panel.

More specifically, when the display panel 110 functions as a display panel, that is, when the driving mode of the display panel 110 is the display mode, a common voltage Vcom is applied to the plurality of touch electrodes TE11 to TE14, TE21 to TE24, and TE31 to TE34 such that the plurality of touch electrodes TE11 to TE14, TE21 to TE24, and TE31 to TE34 become "common electrodes" (which may also be referred to as "Vcom electrodes" that are opposite to pixel electrodes (not illustrated).

In addition, when the display panel 110 functions as a touch screen panel, that is, the driving mode of the display panel 110 is the touch mode, a touch driving voltage is applied to the plurality of touch electrodes TE11 to TE14, TE21 to TE24, and TE31 to TE34 such that the plurality of touch electrodes TE1 to TE14, TE21 to TE24, and TE31 to TE34 become "touch electrodes" that form a capacitor with a touch pointer (e.g., a finger or a pen) and the capacitance formed thereby is measured.

In other words, the plurality of touch electrodes TE11 to TE14, TE21 to TE24, and TE31 to TE34 function as common electrodes (Vcom electrodes) in the display mode, and function as touch electrodes in the touch mode.

To the plurality of touch electrodes TE11 to TE14, TE21 to TE24, and TE31 to TE34, a common voltage Vcom is applied in the display mode, and a touch driving signal is applied in the touch mode.

Accordingly, as illustrated in FIG. 3, for the transmission of the common voltage Vcom or the touch driving signal to the plurality of touch electrodes TE11 to TE14, TE21 to TE24, and TE31 to TE34, touch sensing lines S11 to S14, S21 to S24, and S31 to S34 may be connected to the plurality of touch electrodes TE11 to TE14, TE21 to TE24, and TE31 to TE34, respectively.

Accordingly, in the touch mode, touch driving signals Vtd generated in the touch circuit 150 and the switch circuit 160 are transmitted to all or some of the plurality of touch electrodes TE11 to TE14, TE21 to TE24, and TE31 to TE34 via the touch sensing lines SL11 to SL14, SL21 to SL24, and SL31 to SL34, and in the display mode, a common voltage Vcom supplied from a common voltage supply unit (not illustrated) is transmitted to the plurality of touch electrodes TE11 to TE14, TE21 to TE24, and TE31 to TE34 via the touch sensing lines SL11 to SL14, SL21 to SL24, and SL31 to SL34.

Referring to FIG. 3, one subpixel SP is defined to correspond to each intersection point between the plurality of data lines DL and the plurality of gate lines GL formed in the display panel 110. Here, each subpixel may be one of a red (R) subpixel, a green (G) subpixel, a blue (B) subpixel, and a white (W) subpixel.

Referring to FIG. 3, in a region where each of the plurality of touch electrodes TE11 to TE14, TE21 to TE24, and TE31 to TE34 that function as common electrodes and touch electrodes is formed, two or more subpixels SP may be defined. That is, one of the plurality of touch electrodes TE11 to TE14, TE21 to TE24, and TE31 to TE34 corresponds to two or more subpixels SP.

For example, in one region (unit touch electrode region) where each of the plurality of touch electrodes TE11 to TE14, TE21 to TE24, and TE31 to TE34 that function as common electrodes and touch electrodes is formed, 72 (24×3) data lines DL and 24 gate lines GL may be arranged to define 1278 (24×3×24) subpixels SP.

Meanwhile, as illustrated in FIG. 3, each of the plurality of touch electrodes TE11 to TE14, TE21 to TE24, and TE31 to TE34 that function as common electrodes and touch electrodes may be a block-shaped pattern, or occasionally, a pattern including a comb pattern in a region corresponding to each subpixel SP.

Even in the case where each of the plurality of touch electrodes TE11 to TE14, TE21 to TE24, and TE31 to TE34 that function as common electrodes and touch electrodes is a pattern including the comb pattern, the present disclosure is applicable.

Figure 4:
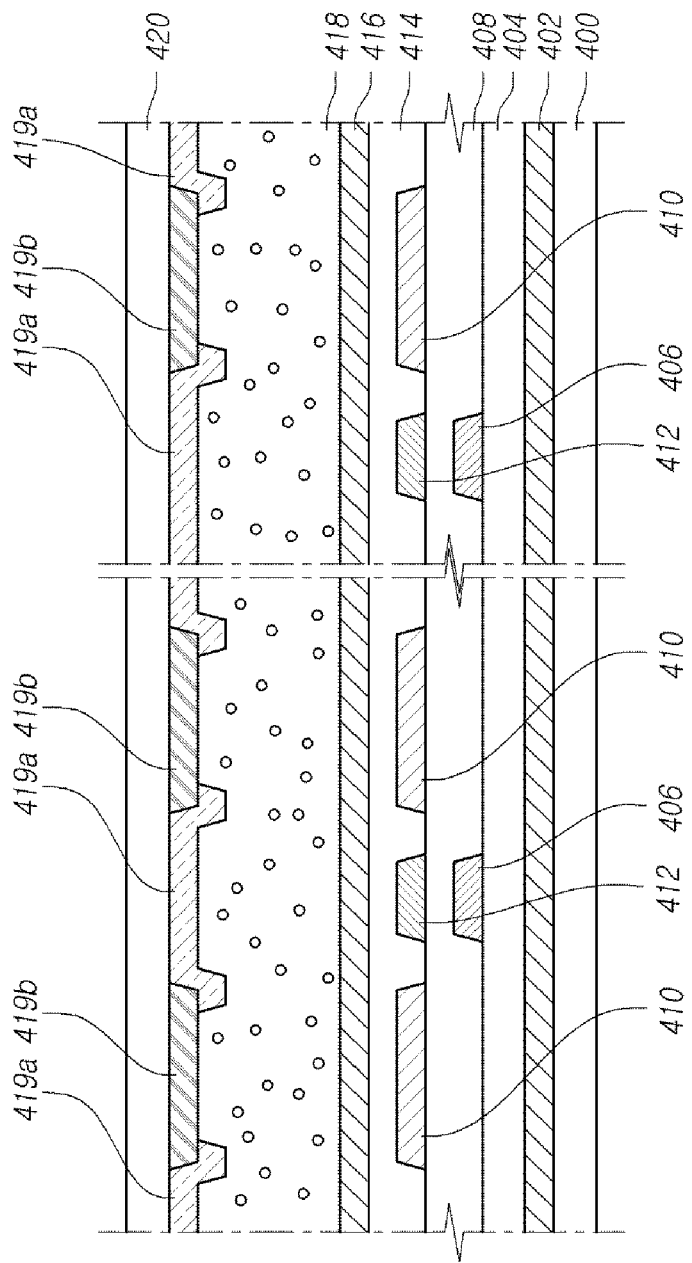
FIG. 4 is a sectional view of a display panel in a case where the touch-screen built-in type display device according to an embodiment of the present disclosure is a liquid crystal display.

FIG. 4 is a sectional view of a display panel in a case where the touch-screen built-in type display device 100 according to an embodiment of the present invention is a liquid crystal display.

FIG. 4 is a sectional view illustrating a region in which one touch electrode is shown among the plurality of touch electrodes TE11 to TE14, TE21 to TE24, and TE31 to TE34 that function as common electrodes and touch electrodes.

Referring to FIG. 4, in the display panel 110 included in the touch screen built-in type display device 100, for example, a gate line 402 is formed on a lower substrate 400 in a first direction (horizontal direction (left-and-right direction in FIG. 3)), and a gate insulation layer 404 is formed thereon.

A data line 406 is formed on the gate insulation layer 404 in a second direction (vertical direction (a direction perpendicular to the plane of the drawing in FIG. 3)), and a first protective layer 408 is formed thereon.

On the first protective layer 408, pixel electrodes 410 and touch sensing lines 412 are formed, and a second protective layer 414 is formed thereon.

Here, the touch sensing lines 412 are connected to the switch circuit 160 in each of the plurality of touch electrodes TE11 to TE14, TE21 to TE24, and TE31 to TE34 that function as common electrodes and touch electrodes such that, in the display mode, the touch sensing lines 412 transmit a common voltage Vcom generated in the common voltage supply unit to the plurality of touch electrodes TE11 to TE14, TE21 to TE24, and TE31 to TE34, and in the touch mode, transmit a touch driving signal generated in the touch circuit 150 and the switch circuit 160 to the plurality of touch electrodes TE11 to TE14, TE21 to TE24, and TE31 to TE34.

One electrode 416 that functions as a common electrode and a touch electrode is formed on the second protective layer 414, and a liquid crystal layer 418 is formed thereon. Here, the one electrode 416 that functions as a common electrode and a touch electrode may be one of the plurality of touch electrodes TE11 to TE14, TE21 to TE24, and TE31 to TE34 that function as common electrodes and touch electrodes, and may be a block-shaped pattern.

On the liquid crystal layer 418, an upper substrate 420 is positioned in which a black matrix 419a, a color filters 419b, and so on may be formed.

While an LCD display device is described with reference to FIG. 4, the present disclosure is not limited thereto, but is applicable to various display devices that may be coupled to a touch panel.

Figure 5:
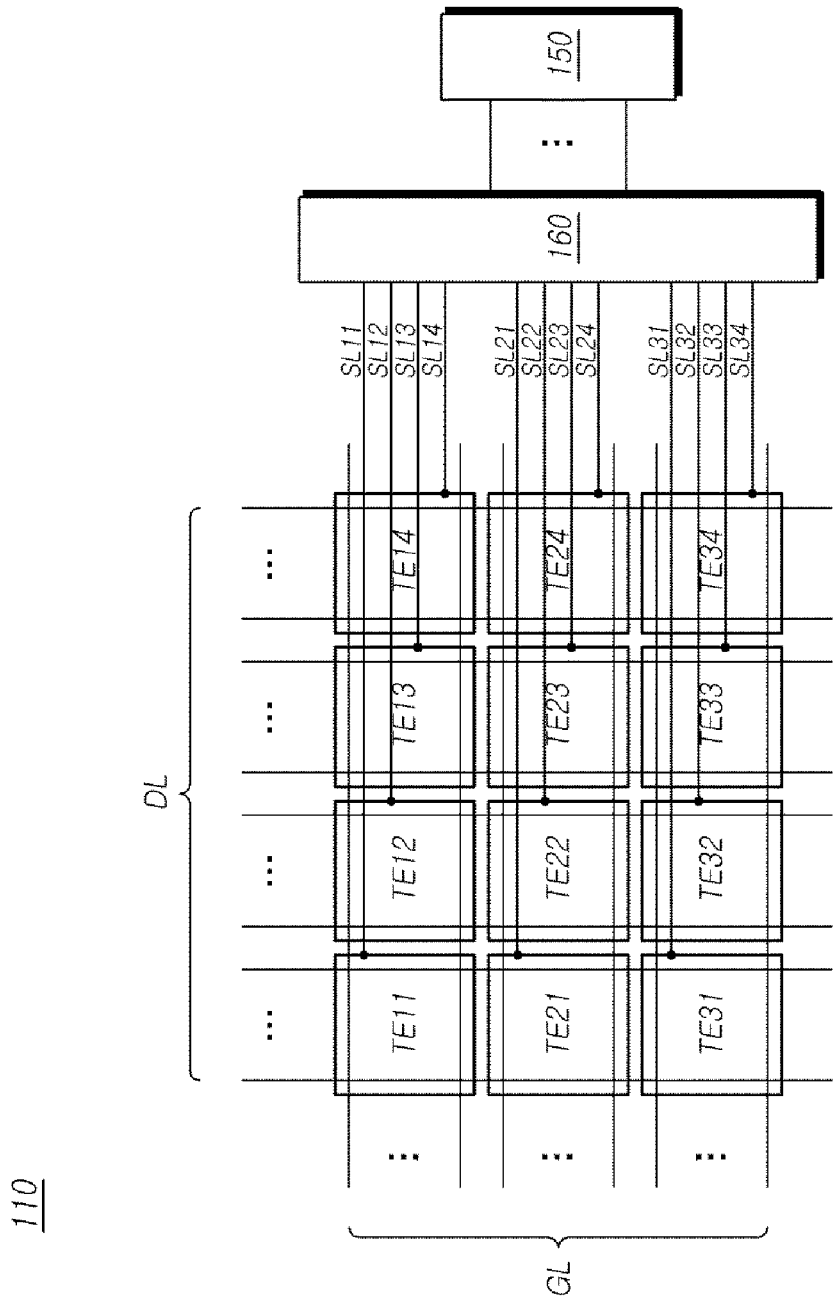
FIG. 5 is another plan view of a display panel included in a touch-screen built-in type display device according to an embodiment of the present disclosure.

FIG. 5 is another plan view of a display panel included in a touch-screen built-in type display device 100 according to an embodiment of the present disclosure.

Referring to FIG. 5, unlike FIG. 3, the touch sensing lines SL11 to SL14, SL21 to SL24, and SL31 to SL34, which are respectively connected to the plurality of touch electrodes TE11 to TE14, TE21 to TE24, and TE31 to TE34 to supply a touch driving signal or a common voltage to the plurality of touch electrodes TE11 to TE14, TE21 to TE24, and TE31 to TE34 may be formed in parallel in the second direction (e.g., the horizontal direction) in which the gate lines GL are formed.

In such a case, a touch driving signal generated from the touch circuit 150 and the switch circuit 160 or a common voltage generated or supplied from the common voltage supply unit may be transmitted to all or some of the plurality of touch electrodes TE11 to TE14, TE21 to TE24, and TE31 to TE34 via the touch sensing lines SL11 to SL14, SL21 to SL24, and SL31 to SL34 that are formed in parallel with the gate lines GL.

As a TFT disposed in each subpixel SP of the present disclosure, an amorphous silicon (hereinafter, referred to as "a-Si") transistor, a metal oxide transistor, and a polysilicon transistor may be exemplified, and the polysilicon may be, but not exclusively, a low temperature polysilicon (hereinafter, referred to as "LTPS") and a high temperature polysilicon (hereinafter, referred to as "HTPS").

Figure 6:
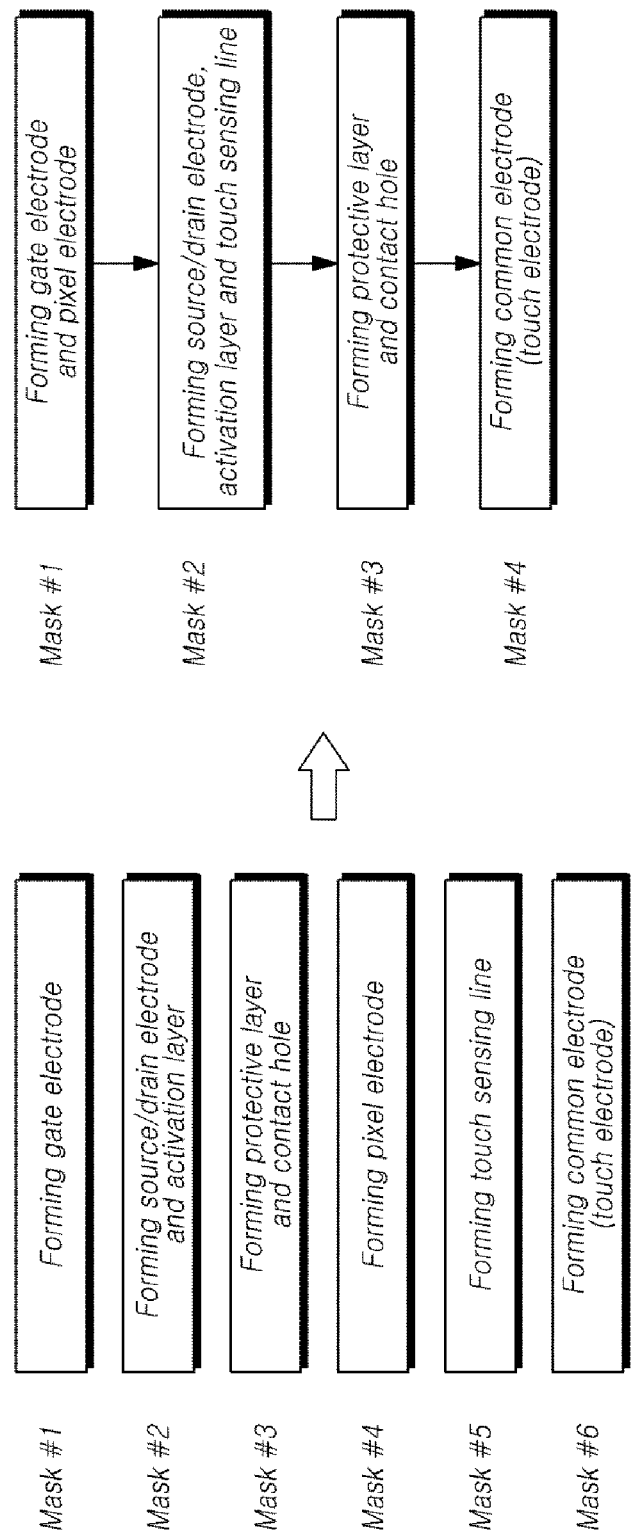
FIG. 6 is a view illustrating a state in which fabrication processes of a touch-screen built-in type display device according to the present disclosure are reduced.

FIG. 6 is a view illustrating a state in which fabrication processes of a touch-screen built-in type display device according to the present disclosure are reduced.

Referring to FIG. 6, in general, a fabrication process of a touch screen built-in type display device includes a first mask process (Mask#1) in which a gate line and a gate electrode of a TFT are formed, a second mask process (Mask#2) in which an activation layer of the TFT is formed in each subpixel and a source electrode and a drain electrode are formed on the activation layer, a third mask process (Mask#3) in which a protective layer is formed to protect the TFT and a contact hole, a fourth mask process (Mask#4) in which a pixel electrode is formed in each subpixel, a fifth mask process (Mask#5) in which a touch sensing line is formed, and a sixth mask process (Mask#6) in which a touch electrode (a common electrode) is formed.

Particularly, because the touch sensing line is additionally formed, the number of processes increases, and in a case where a protective layer is additionally formed on the touch sensing line and then a process of forming a contact hole to electrically connect the touch sensing line and the touch electrode (common electrode) is performed, the number of mask processes further increases.

Thus, the touch screen built-in type display device has a disadvantage in that the number of mask processes increases because it is necessary to form a separate touch sensing line inside the display panel.

Further, when the number of mask processes increases, there are problems in that a production takt time also increases, thereby deteriorating production efficiency, and a failure rate also increases due to contamination or particles that may occur during the processes.

In the touch screen built-in type display device of the present disclosure and the fabrication method thereof, an array substrate can be completed through four mask processes by forming a pixel electrode in the first mask process (Mask#1) in which a gate electrode is formed, forming a touch sensing line in the second mask process (Mask#2) in which an activation layer, a source electrode, a drain electrode, and a data line are formed, forming a protective layer and a contact hole in the third process (Mask#3), and forming a touch electrode (common electrode) in the fourth mask process (Mask#4).

Particularly, in the touch screen built-in type display device, the thin transistors disposed in respective subpixels are arranged in zigzags in left and right sides of each data line so that the number of data lines is reduced, and a touch sensing line is formed between each adjacent data lines among data lines of which the number is reduced in the same process as the data lines, thereby simplifying the fabrication processes.

Figure 7:
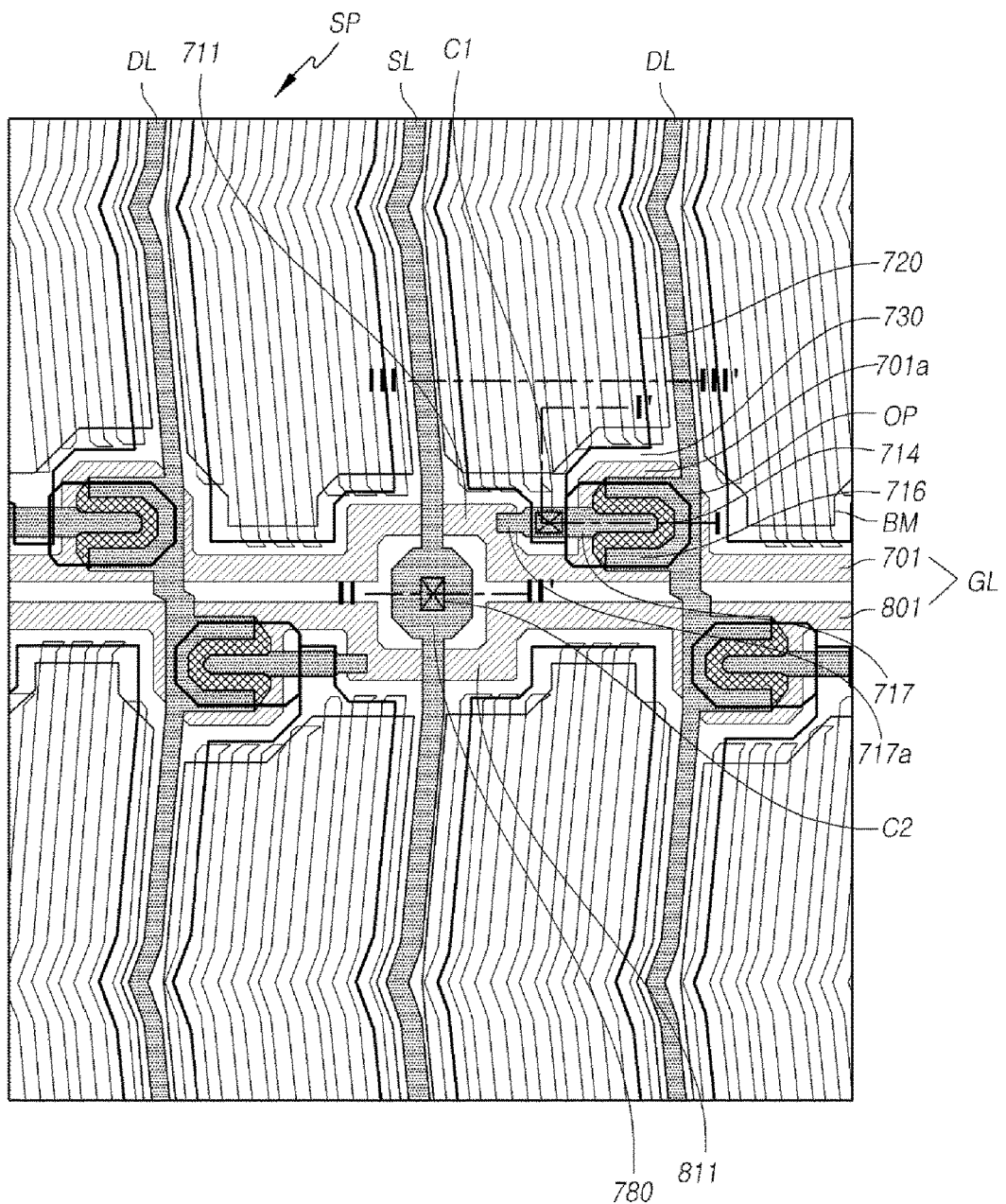
FIG. 7 is a plan view of a structure of subpixels of a touch-screen built-in type display device according to an embodiment of the present disclosure.
Figure 8:
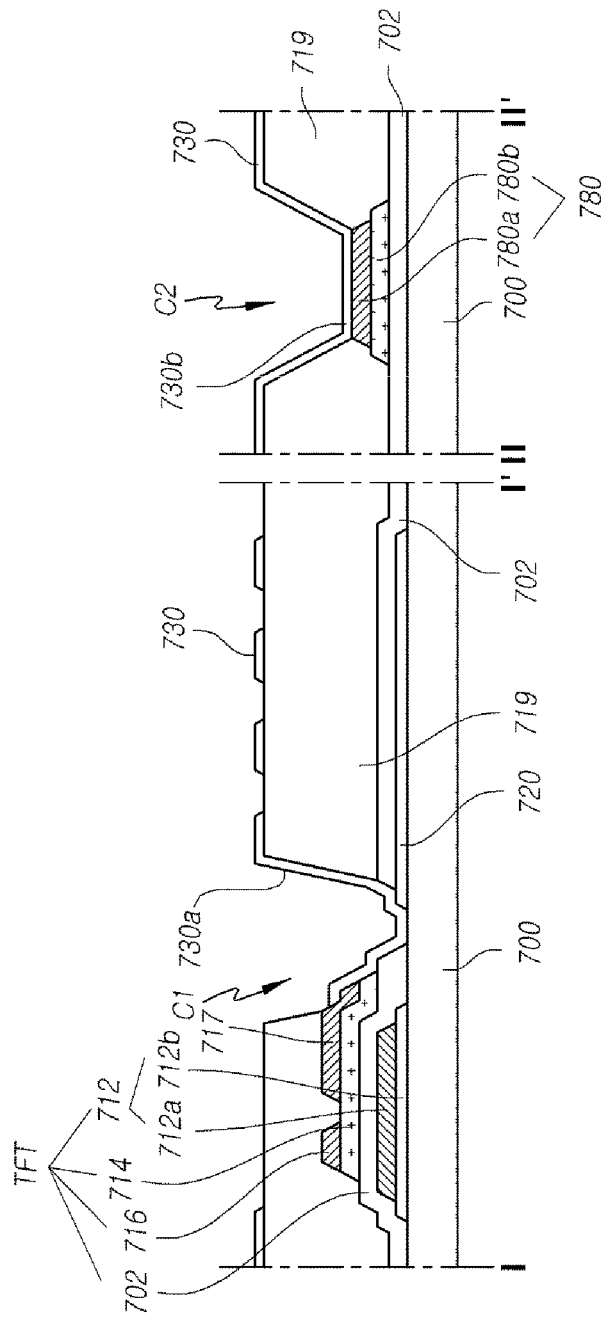
FIGS. 8 and 9 are sectional views taken along lines I-I',II-II', and III-III' in FIG. 7.
Figure 9:
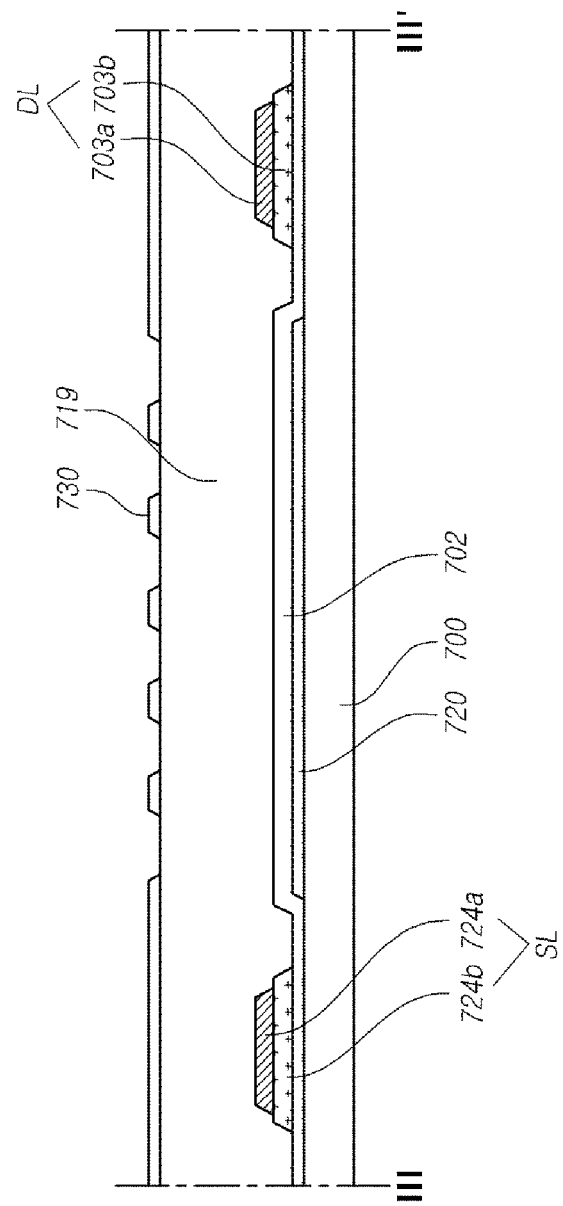

FIG. 7 is a plan view of a structure of subpixels of a touch-screen built-in type display device according to an embodiment of the present disclosure, and FIGS. 8 and 9 are sectional views taken along lines I-I', II-II', and III-III' in FIG. 7.

Referring to FIGS. 7 to 9, the touch screen built-in type display device of the present disclosure includes a plurality of gate lines GL arranged on a substrate 700 in a first direction, a plurality of data lines DL arranged on the substrate 700 in a second direction, and a touch sensing line SL alternately arranged with the data lines DL to be in parallel with the data lines DL.

In addition, the touch screen built-in type display device includes a plurality of subpixels SP, which are defined by the gate lines GL, the data lines DL, and the touch sensing lines SL.

In addition, TFTs are disposed in an intersection region of a gate line GL and a data line DL in each subpixel SP.

Particularly, in the touch screen built-in type display device, the gate lines GL are arranged in such a manner that a pair of a first gate line 701 and a second gate line 801 are arranged to be adjacent to each other with subpixels SP, which neighbor in the first direction, being interposed therebetween.

Accordingly, a data line DL intersects the first gate line 701 and the second gate line 801, and TFTs are arranged in the intersection region between the first gate line 701 and the data line DL, and the intersection region between the second gate line 801 and the data line DL, respectively.

As illustrated in the drawing, it can be seen that, with reference to one data line DL, the TFTs for a column of subpixels SP are arranged in the left side of the data line DL (the subpixels corresponding to the first gate line 701) and the TFTs for an adjacent column of subpixels SP are arranged in the right side of the data line DL (the subpixels corresponding to the second gate line 801), respectively. That is, the touch screen built-in type display device of the present disclosure is characterized in that the TFTs are arranged in a zigzag form on the left and right sides with reference to a data line DL. In other words, a data line DL may be disposed between two subpixels SP, in which the transistors of both subpixels SP are electrically connected to the data line DL.

Such a TFT arrangement structure has an advantage in that the number of data lines DL arranged on the display panel 110 can be reduced.

In each subpixel SP, a pixel electrode 720 is disposed on the substrate 700, and a common electrode 730 is arranged on the pixel electrode 720 with a gate insulation layer 702 and a protective layer 719 being interposed between the pixel electrode 720 and the common electrode 730.

As illustrated in FIG. 1, the common electrode 730 has a block pattern structure that corresponds to at least one subpixel SP or at least two sub-pixels SP, and is electrically connected to a touch sensing line SL via a second contact hole C2.

Referring to FIG. 7, in the region where the first gate line 701 of one pair of gate lines GL intersects the touch sensing line SL, a first bent portion 711 is disposed in which a portion of the first gate line 701 is bent. The second gate line 801 also includes a second bent portion 811 disposed to be opposite to the first bent portion 711.

Each of the first bent portion 711 and the second bent portion 811 overlaps with a portion of a drain electrode 717 of the TFT disposed in the corresponding subpixel so as to function to secure a storage capacitance of the subpixel SP.

A sensing contact portion 780 is formed between the first bent portion 711 and second bent portion 811 by an expanded portion of the touch sensing line SL, and the common electrode 730 is electrically connected to the sensing contact portion 780 exposed through the second contact hole C2.

In addition, because the common electrode 730 of the touch screen built-in type display device of the present disclosure is formed as a touch electrode that corresponds to a plurality of subpixels SP as described above, the common electrode 730 is integrally formed in the subpixel region except for a slit type open region and an open portion OP corresponding to a TFT.

The open portion OP is formed in the region corresponding to the TFT in the common electrode 730 in order to improve an element characteristic by reducing a parasitic capacitance between the common electrode 730 and the TFT.

Referring to a detailed section of a subpixel region with reference to FIGS. 8 and 9, in a region where a gate line GL (the first gate line 701 in FIG. 7) and a data line DL intersect on the substrate 700, a TFT is disposed which includes a gate electrode 712, a gate insulation layer 702, an activation layer 714, a source electrode 716, and a drain electrode 717.

In addition, in the present disclosure, because the pixel electrode 720 is disposed on the substrate 700, the pixel electrode 720 and the gate electrode 712 are arranged on the same plane.

In addition, the gate electrode 712 of the present disclosure is formed by a first gate pattern 712a and a second gate pattern 712b that are stacked one on another, in which the second gate pattern 712b is formed of the same transparent conductive material as the pixel electrode 720. In this context, detailed descriptions will be made with reference to fabrication processes of a touch-screen built-in type display device of the present disclosure as illustrated in FIGS. 10A to 13B.

On the pixel electrode 720, a gate insulation layer 702 and a protective layer 719 are stacked, and on the protective layer 719, a common electrode 730 is arranged to overlap with the pixel electrode 720. The common electrode 730 may be formed of a plurality of slit patterns (see I-I' region).

In addition, a first contact hole C1 in which the protective layer 719 and the gate insulation layer 702 are removed is formed between the drain electrode 717 of the TFT and the pixel electrode 720, and a first contact portion 730a is arranged inside the first contact hole C1. The first contact portion 730a is in direct contact with the drain electrode 717 and the pixel electrode 720 to electrically interconnect the pixel electrode 720 and the drain electrode 717 (see I-I' region).

In addition, the source electrode 716 may be electrically connected to one among the data lines DL, or may be a part protruding from one among the data lines DL, as shown in FIG. 7.

Referring to II-II' region together with FIG. 7, a touch sensing line SL is arranged in parallel with a data line DL, and is electrically connected to a common electrode 730 through a second contact hole C2 formed in a sensing contact portion 780. The touch sensing lines SL may not overlap the data lines DL, in this embodiment.

The sensing contact portion 780 is formed in a structure in which a first sensing contact pattern 780a and a second sensing contact pattern are stacked one on another, and the second sensing contact pattern 780b is formed of the same material as the activation layer 714.

In the second contact hole C2 region, a second contact portion 730b is arranged, and the second contact portion 730b electrically interconnects the sensing contact portion 780 and the common electrode 730. The first contact portion 730a, the second contact portion 730b, and the common electrode 730 are integrally formed.

In addition, referring to the III-III' region together with FIG. 7, a pixel electrode 720 is arranged on the substrate 700, and a touch sensing line SL and a data line DL are arranged on a gate insulation layer 702 with the pixel electrode 720 being interposed between the touch sensing line SL and the data line DL.

The touch sensing line SL is formed in a structure in which a first sensing pattern 724a and a second sensing pattern 724b are stacked one on another, and the data line DL is formed in a structure in which a first data pattern 703a and a second data pattern 703b are stacked one on another.

The second sensing pattern 724b and the second data pattern 703b are formed of the same material as the activation layer 714.

The protective layer 719 is formed on the touch sensing line SL, the data line DL, and the gate insulation layer 702, and the common electrode 730 is disposed on the protective layer 719.

The touch screen built-in type display device of the present disclosure can reduce the number of data lines DL by arranging TFTs arranged in each subpixel SP in a zigzag form on left and right sides with reference to each data line DL.

In addition, because the number of data lines DL is reduced so that the touch sensing lines SL may be alternately arranged with the data lines DL, it is possible to implement a display device with a touch screen built therein.

The method of fabricating the touch screen built-in type display device can implement a touch screen built-in type display device without adding a mask process by forming a pixel electrode together with a gate electrode when forming the gate electrode, and forming a touch sensing line SL together with a data line DL when forming the touch sensing line SL.

FIGS. 10A to 13B are views illustrating fabrication processes of a touch-screen built-in type display device according to an embodiment of the present disclosure.

Figure 10A:
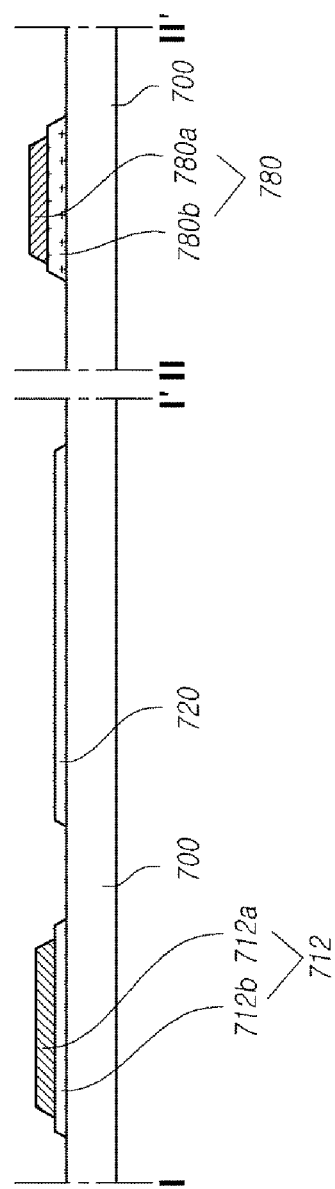
Figure 10B:
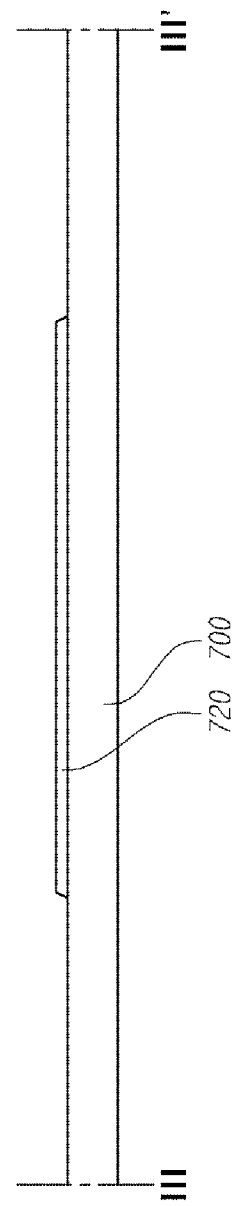

First, referring to FIGS. 10A and 10B, after a transparent conductive material layer and a gate metal layer are sequentially formed on the substrate 700 where a plurality of subpixels are sectioned, according to a first mask process, a pixel electrode 720 is formed in each subpixel region and a gate electrode 712 is formed in a TFT forming region.

In the first mask process, the gate electrode 712 and the pixel electrode 720 are simultaneously formed by using a half-tone mask or a diffraction mask, and performing an etching process twice.

Accordingly, the gate electrode 712 is formed by a structure in which a first gate pattern 712a formed of a gate metal layer and a second gate pattern 712b formed of a transparent conductive material layer are stacked on one on another.

The gate metal layer may be formed by stacking two or more metal layers, and the gate metal layer and the transparent conductive material layer may be formed in a stacked structure.

Accordingly, the gate metal layer may be formed using at least one selected from a conductive metal group including aluminum (Al), tungsten (W), copper (Cu), molybdenum (Mo), chrome (Cr), titanium (Ti), moly-tungsten (MoW), moly-titanium (MoTi), and a copper/moly-titanium (Cu/MoTi), but is not limited thereto.

In addition, the transparent conductive material layer may be formed using any one selected from a group including Indium Tin Oxide (ITO), Indium Zinc Oxide (IZO), and Carbon Nano Tube (CNT), but is not limited thereto. The gate metal layer is not limited to being formed in a form of dual metal layers, and thus may be formed in a single metal layer.

Figure 11A:
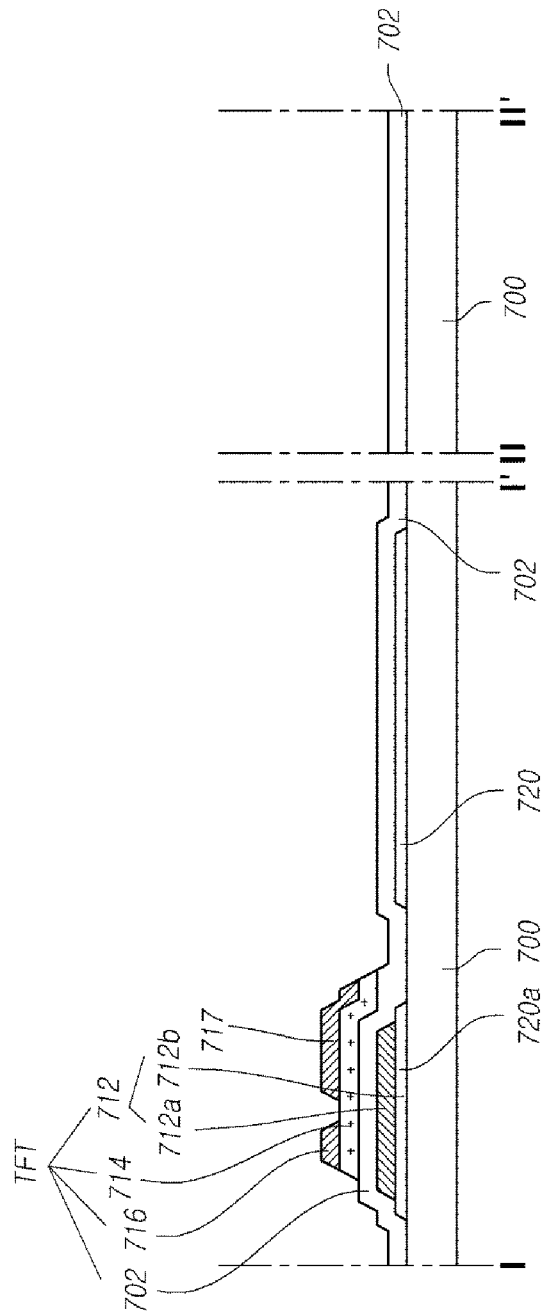
Figure 12A:
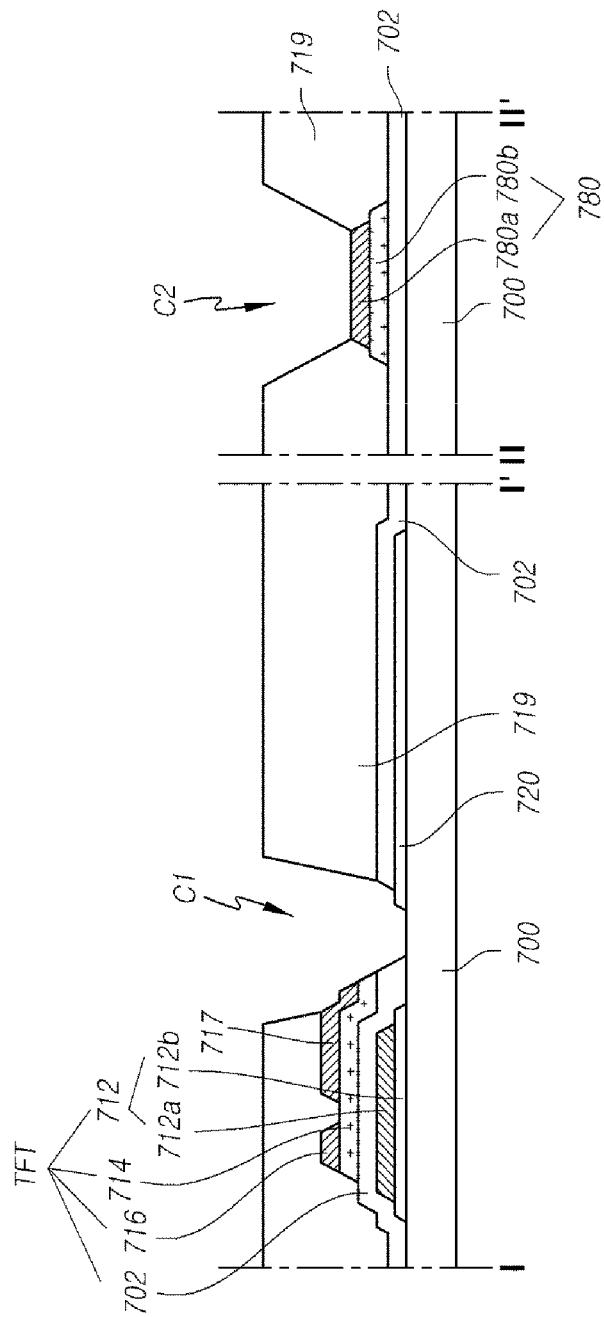
Figure 12B:
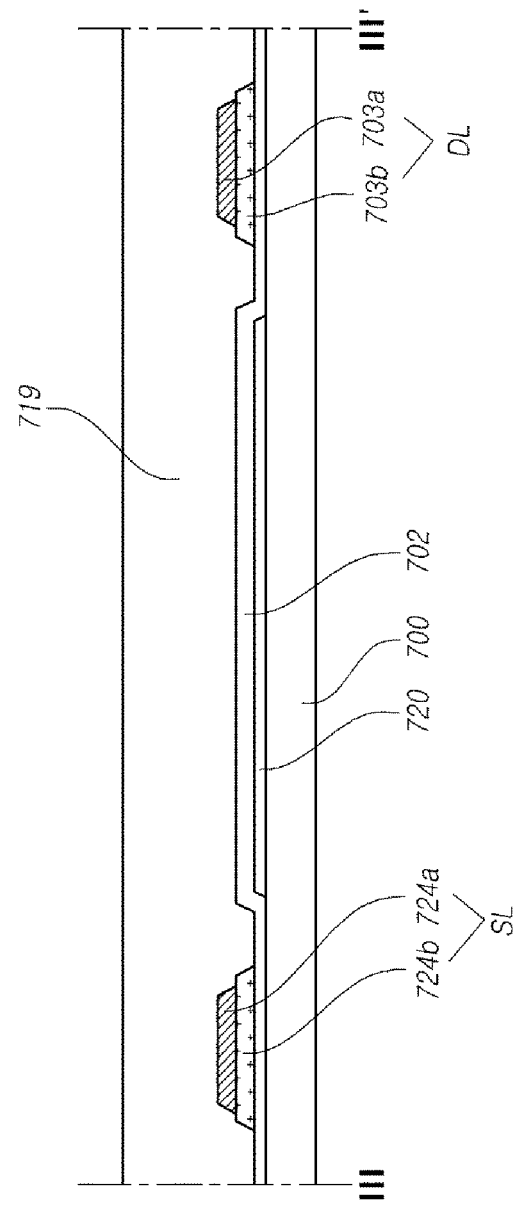
Figure 13A:
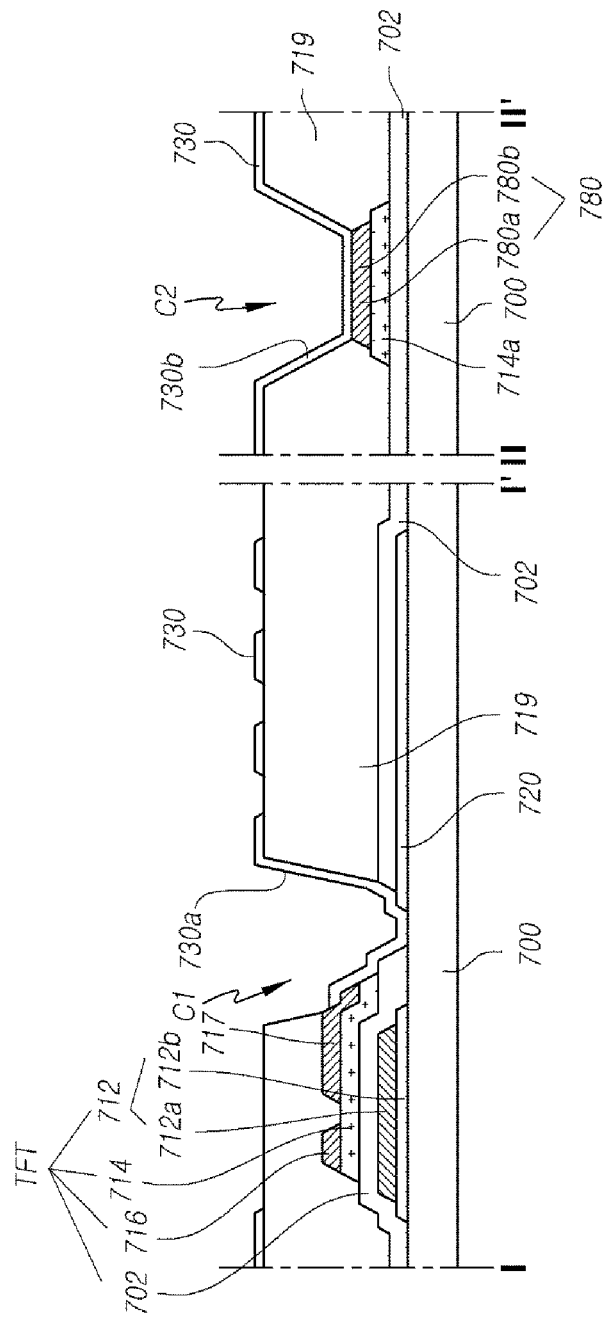
Figure 13B:
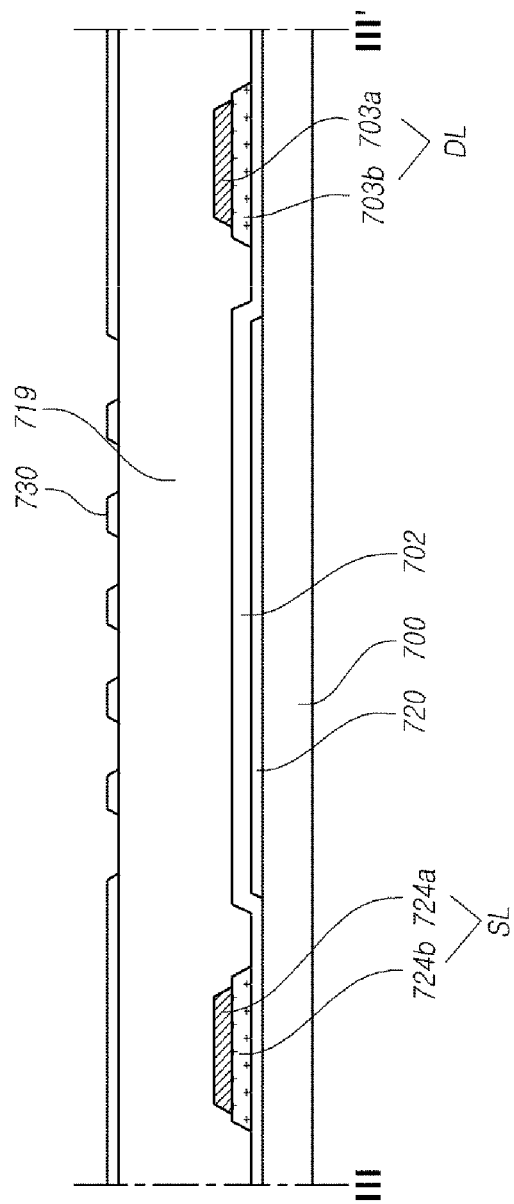

As described above, when the gate electrode 712 and the pixel electrode 720 are formed on the substrate 700, as illustrated in FIGS. 11A and 11B, the gate insulation layer 702 is formed on the entire face of the substrate 700, and then, a semiconductor layer and a source and drain metal layer are continuously formed.

The source and drain metal layer may be formed using at least one selected from a conductive metal group including aluminum (Al), tungsten (W), copper (Cu), molybdenum (Mo), chrome (Cr), titanium (Ti), moly-tungsten (MoW), moly-titanium (MoTi), and a copper/moly-titanium (Cu/MoTi), but is not limited thereto.

The semiconductor layer may be formed of a semiconductor material (e.g., amorphous silicon), polysilicon (e.g., LTPS or HTPS), or the like. In addition, the semiconductor layer may be formed using an oxide semiconductor material (e.g., Zinc Oxide (ZO), Indium Gallium Zinc Oxide (IGZO), Zinc Indium Oxide (ZIO), or Ga-doped Zinc Oxide (GZO)).

Then, according to one or more second mask processes using a diffraction mask or a half-tone mask, the activation layer 714, the source electrode 716, and the drain electrode 717 are formed on the gate insulation layer 702 that corresponds to the gate electrode 712. The TFT is composed of the gate electrode 712, the gate insulation layer 702, the activation layer 714, the source electrode 716, and the drain electrode 717.

Referring to the III-III' region, the gate insulation layer 702 is formed on the pixel electrode 720, and a touch sensing line SL and a data line DL are formed on the gate insulation layer 702 with the pixel electrode 720 being interposed between the touch sensing line SL and the data line DL.

The touch sensing line SL is formed in a structure in which a first sensing pattern 724a and a second sensing pattern 724b are stacked on one another, and the data line DL is formed in a structure in which a first data pattern 703a and a second data pattern 703b are stacked on one another.

The first sensing pattern 724a and the first data pattern 703a are formed of the same material as the source and drain metal layer, and the second sensing pattern 724b and the second data pattern 703b are formed of the same semiconductor material as the activation layer 714. Thus, the first sensing pattern 724a, the first data pattern 703a, and the source and drain electrodes 716, 717 may be formed according to a same mask process, and the second sensing pattern 724b, the second data pattern 703b, and the activation layer 714 may be formed according to a same mask process.

In addition, as illustrated in the drawings, the touch sensing line SL and the data line DL are formed on the same plane, i.e. the gate insulation layer 702.

When the TFT is completed as described above, as illustrated in FIGS. 12A and 12B, a first protective layer 719 is formed on the entire surface of the substrate 700, and then according to the third mask process, first and second contact holes C1 and C2 are formed to expose the region between the drain electrode 717 of the TFT and the pixel electrode 720 and the sensing contact portion 780 of the touch sensing line SL.

The protective layer 719 may be formed of an inorganic material (e.g., $SiO_2$ or $SiN_x$) or an organic material (e.g., photo acryl), but the present disclosure is not limited thereto.

By the first contact hole C1, at least a part of the drain electrode 717 and the pixel electrode 720 are exposed through the first protective layer 719.

When the protective layer 719 is formed on the substrate 700 as described above, as illustrated in FIGS. 13A and 13B, the transparent conductive material layer is formed on the entire face of the substrate 700, and then, according to the fourth mask process, the common electrode 730 is formed to overlap with the pixel electrode 720.

As described above, the common electrode 730 may be a touch electrode, or may be formed in a block pattern structure that corresponds to a plurality of subpixels.

The common electrode 730 may be formed of a plurality of slit patterns in each subpixel region.

In addition, in the first contact hole C1 and the second contact hole C2, a first contact portion 730a and a second contact portion 730b are simultaneously formed which are formed of a transparent conductive material layer. The first and second contact portion 730a and 730b may be integrally formed with the common electrode 730.

As described above, according to a display device with a built-in type touch screen of the present disclosure, it is possible to reduce the number of data lines arranged in a display panel by arranging TFTs in a zigzag form in the subpixels on the left and right sides of each data line.

In addition, according to a method of fabricating a touch screen built-in type display device of the present disclosure, it is possible to reduce the number of mask processes by forming a pixel electrode simultaneously when forming a gate electrode, and forming a touch sensing line simultaneously when forming a data line.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A display device, the display device comprising:
a gate line extending along a first direction on a substrate;
a data line extending along a second direction directly on an insulation layer on the substrate;
a subpixel at an intersection of the gate line and the data line, the subpixel including:
a pixel electrode,
a transistor including:
  a gate electrode on the substrate, wherein the gate electrode is provided in a same layer as the pixel electrode,
  a part of the insulation layer on the gate electrode and the pixel electrode,
  an activation layer on the part of the insulation layer,
  a drain electrode on the activation layer, the drain electrode electrically connected to the pixel electrode, and
  a source electrode on the activation layer, the source electrode electrically connected to the data line,
a common electrode overlapping with the pixel electrode; and
a touch sensing line directly on the insulation layer, the touch sensing line provided in a same layer as the data line directly on the insulation layer, and the touch sensing line electrically connected to the common electrode,
wherein the pixel electrode is interposed between the touch sensing line and the data line.

2. The display device of claim 1, wherein the data line does not overlap with the touch sensing line.

3. The display device of claim 1, wherein the touch sensing line is disposed in between the data line and another data line.

4. The display device of claim 1, wherein the data line is disposed between the subpixel and another subpixel having another transistor, and wherein the data line is electrically connected to the transistor of the subpixel and the another transistor of the another subpixel.

5. The display device of claim 1, wherein a part of the touch sensing line is of a same material as a part of the data line.

6. The display device of claim 1, wherein a part of the touch sensing line is of a same material as the activation layer.

7. The display device of claim 1, wherein a part of the touch sensing line is of a same material as the source electrode and the drain electrode.

8. The display device of claim 1, further comprising a first protective layer between the common electrode and the touch sensing line, and wherein the touch sensing line is electrically connected to the common electrode through a contact hole in the first protective layer.

9. The display device of claim 1, wherein the pixel electrode is disposed between the substrate and the insulation layer.

10. The display device of claim 9, wherein a part of the pixel electrode is of a same material as a part of the gate electrode.

11. The display device of claim 1, wherein the touch sensing line extends along the second direction.

12. A method of fabricating a display device, the method comprising:
forming a gate line on a substrate, the gate line extending in a first direction;
forming a gate electrode and a pixel electrode on the substrate simultaneously according to a first mask process;
forming a gate insulation layer over the gate line, the gate electrode, and the pixel electrode;
forming an activation layer on the gate insulation layer, the activation layer overlapping with a part of the gate electrode;
forming at least a part of the data line and at least a part of a touch sensing line on the gate insulation layer according to a second mask process;
forming a source electrode and a drain electrode on the activation layer, the drain electrode electrically connected to the pixel electrode and the source electrode electrically connected to the data line; and
forming a common electrode overlapping with the pixel electrode, the common electrode electrically connected to the touch sensing line,
wherein the gate electrode, the gate insulation layer, the activation layer, the source electrode, and the drain electrode form a transistor, and wherein the transistor and the pixel electrode form a subpixel,
wherein the first mask process is performed by implementing an etching process twice, and
wherein the pixel electrode is interposed between the touch sensing line and the data line.

13. The method of claim 12, wherein the data line does not overlap with the touch sensing line.

14. The method of claim 12, further comprising forming at least a part of another data line according to the second mask process, and wherein the touch sensing line is disposed in between the data line and the another data line.

15. The method of claim 12, further comprising forming another subpixel including another transistor, wherein the data line is disposed between the subpixel and the another subpixel, and wherein the data line is electrically connected to the another transistor of the another subpixel.

16. The method of claim 12, wherein the activation layer is formed according to the second mask process.

17. The method of claim 12, wherein the source electrode and the drain electrode are formed according to the second mask process.

18. The method of claim 12, further comprising:
forming a protective layer on the touch sensing line and the pixel electrode; and
forming a first contact hole that exposes a portion of the pixel electrode and a second contact hole that exposes a portion of the touch sensing line in the protective layer according to a third mask process.

19. The method of claim 18, further comprising forming a first contact portion in the first contact hole that electrically connects the drain electrode and the pixel electrode, and wherein the first contact portion and the common electrode are formed simultaneously according to a fourth mask process.

20. The method of claim 18, further comprising forming a second contact portion in the second contact hole that electrically interconnects the touch sensing line and the common electrode, and wherein the second contact portion and the common electrode are formed simultaneously according to a fourth mask process.

21. The method of claim 12, wherein the gate line, the gate electrode, and the pixel electrode are formed simultaneously according to the first mask process.

22. A display device, the display device comprising:
a gate line extending along a first direction on a substrate;
a data line extending along a second direction directly on an insulation layer on the substrate;
a subpixel at an intersection of the gate line and the data line, the subpixel including:
   a pixel electrode,
   a transistor including:
      a gate electrode on the substrate,
      a part of the insulation layer on the gate electrode and the pixel electrode,
      an activation layer on the part of the insulation layer,
      a drain electrode on the activation layer, the drain electrode electrically connected to the pixel electrode, and
      a source electrode on the activation layer, the source electrode electrically connected to the data line,
a common electrode overlapping with the pixel electrode; and
a touch sensing line directly on the insulation layer, the touch sensing line provided in a same layer as the data line directly on the insulation layer, and the touch sensing line electrically connected to the common electrode,
wherein the pixel electrode is interposed between the touch sensing line and the data line, and
wherein the data line is disposed between the subpixel and another subpixel having another transistor, and wherein the data line is electrically connected to the transistor of the subpixel and the another transistor of the another subpixel.

* * * * *